United States Patent
Born et al.

(10) Patent No.: US 6,919,398 B1
(45) Date of Patent: Jul. 19, 2005

(54) FORMING OR COATING MATERIAL AND UTILIZATION THEREOF

(75) Inventors: Andrea Born, Elbtal (DE); Reinhardt Wink, Hochheim (DE); Josef Ermuth, Wiesbaden (DE)

(73) Assignee: Sto AG (DE)

( * ) Notice: Subject to any disclaimer, the term of this patent is extended or adjusted under 35 U.S.C. 154(b) by 0 days.

(21) Appl. No.: 09/869,183

(22) PCT Filed: Dec. 15, 1999

(86) PCT No.: PCT/DE99/04036

§ 371 (c)(1),
(2), (4) Date: Aug. 28, 2001

(87) PCT Pub. No.: WO00/39049

PCT Pub. Date: Jul. 6, 2000

(30) Foreign Application Priority Data

Dec. 24, 1998 (DE) .......................................... 198 60 161
May 12, 1999 (DE) .......................................... 199 21 876

(51) Int. Cl.⁷ ................................................ C08K 3/34
(52) U.S. Cl. ...................... 524/493; 524/492; 524/494; 524/860
(58) Field of Search .............................. 524/492, 493, 524/494, 860, 497

(56) References Cited

U.S. PATENT DOCUMENTS 4,532,315 A * 7/1985 Letoffe et al. ................ 528/14
5,328,941 A * 7/1994 Hayashi et al. ............... 522/33
6,239,246 B1 * 5/2001 Takahashi et al. ........... 528/32

FOREIGN PATENT DOCUMENTS

| DE | 30 19 828 | 11/1980 |
| DE | 40 40 128 | 6/1992 |
| EP | 0 506 470 | 9/1992 |
| EP | 0 696 627 | 2/1996 |

* cited by examiner

*Primary Examiner*—James J. Seidleck
*Assistant Examiner*—U. K Rajguru
(74) *Attorney, Agent, or Firm*—Michael L. Dunn

(57) ABSTRACT

Molding or coating materials, in particular coating substances for producing self-cleaning moldings or coatings, for example on facades and other building elements, which if they are exposed to rain or moving water from time to time, clean themselves and prevent permanent settlement of dirt particles and pollutants. In accordance with the invention that object is attained with molding or coating materials having the features set forth in the opening part of this specification, which are characterized in that the filler contained has an at least bimodal particle size distribution, wherein the one particle size range (A) has a mean particle diameter of at least 5 µm and the other particle size range (B) has a mean particle diameter of at most 3 µm and the weight ratio of the particles of the former particle size range (A) to the particles of the latter particle size range (B) is between 0.01:1 and 12:1 and the constituents of the dispersion arc so selected in respect of their hydrophilic properties that the static initial contact angle after 3 min equilibration is greater than 130°.

29 Claims, No Drawings

FORMING OR COATING MATERIAL AND UTILIZATION THEREOF

BACKGROUND OF THE INVENTION

The invention concerns molding or coating materials, in particular for mineral substrates such as for building facades. The invention relates to molding or coating materials preferably including an aqueous dispersion of binding agent including at least one hydrophobic resin, hydrophobic resin precursor and/or wax and optionally includes hydrophobised filler and conventional, optionally hydrophobised additives.

Coating substances with those constituents are known for example in the form of silicone resin paints which are also used for coating building facades. Known coating substances of that kind however, suffer from the disadvantage that their full hydrophobicity is only developed after weathering for two to three years, when water-soluble constituents contained in the dry film have been washed out by the rain. The result of this is that, in the initial phase, increased soiling can occur, in particular after long dry periods after which there are large amounts of dirt particles and pollutants in the atmosphere and these are absorbed by precipitation water. The dirt particles are deposited on wettable surfaces and result on the one hand in the appearance of the facades and other contaminated surfaces being adversely affected while on the other hand they result in corrosive attack of the surfaces on which they are deposited.

The operation of cleaning façade and other building surfaces such as light domes, solar panels, roofs and façade decorations is often difficult and expensive as scaffolding frequently has to be erected for such cleaning of the buildings. In the case of light domes, glass roofs and the like in addition to the above-indicated disadvantages there is also a gradual loss in transparency which makes a cleaning procedure absolutely essential from time to time.

Therefore the object of the present invention is to afford molding or coating materials, in particular coating substances for producing self-cleaning moldings or coatings, for example on facades and other building elements, which, if they are exposed to rain or moving water from time to time, clean themselves and prevent permanent settlement of dirt particles and pollutants.

BRIEF DESCRIPTION OF THE INVENTION

In accordance with the invention that object is attained with molding or coating materials having the features set forth in the opening part of this specification, which are characterized in that the filler contained has an at least bimodal particle size distribution, wherein the one particle size range (A) has a mean particle diameter of at least 5 $\mu$m and the other particle size range (B) has a mean particle diameter of at most 3 $\mu$m and the weight ratio of the particles of the former particle size range (A) to the particles of the latter particle size range (B) is between 0.01:1 and 12:1 and the constituents of the dispersion are so selected in respect of their hydrophilic properties that the static initial contact angle after 3 min equilibration is greater than 130°.

DETAILED DESCRIPTION OF THE INVENTION

Items having a surface of the compositions according to the invention, due to the desired self-cleaning effect, which come into contact with flowing water such as rain remain clean for longer periods and therefore require a cleaning treatment at greater intervals. This is because the deposit of dirt particles and spores as well as primary and secondary contamination with micro-organisms is avoided. The materials according to the invention have the effects that dirty rainwater runs off the surface of an item and dust particles deposited on the surface are entrained by the water drops as they roll off. In addition such compositions, as coating substances, since they afford permanently dry facades due to the rainwater being caused to run off, result in the avoidance of moisture damage, in particular at weather sides. A further effect is that micro-organisms are deprived of an important basic of life, namely water, so that for example facades and other building surfaces are substantially protected from attack and infestation with fungi, algae, lichen and so forth naturally without the addition of biological agents to the compositions.

The static initial contact angle referred to herein is the contact angle after a surface is dried for 28 days at 23° C. and 50% relative humidity.

The operation of determining the contact angle at the three-phase contact line between solid body, liquid and gas can be effected with the contact angle measuring device G1 from Krüss. The coating material to be tested is applied to a substrate and dried for 28 days under the specified conditions. One drop of distilled water (about 20 $\mu$l)) is then applied to the substrate by means of a microliter syringe and the contact angle is measured by reading it off on a goniometer scale. From applying the drop to taking the measurement there is a waiting period of three minutes so that the system can become equilibrated. Five drops are measured at various locations on each test body so that a total of fifteen measurement values are ascertained for each substance being tested.

It is important that the static initial contact angle be determined since the contact angle changes with time due to weathering and an increase in the hydrophobicity of the surface so that comparable values are not obtained if the contact angle is determined at substantially different moments in time. Silicate paints and dispersion or latex paints have initial contact angles of below 90°, silicone resin paints are below 120° and are therefore considerably below the values set in accordance with the invention.

Setting of the static initial contact angle can be affected by means of the qualitative and quantitative selection of the binding agents, the fillers and the additives, their content of hydrophilic substances such as emulsifiers and stabilisers, and by post-treatment of the additives in order to make them water-swellable or hydrophobic.

Desirably the molding or coating materials according to the invention have as a coating, determined in accordance with the method set forth hereinafter, a maximum water absorption c<10% by weight, preferably <7% by weight, preferably <5% by weight, quite particularly <3% by weight, above all <2% by weight. To determine the maximum water absorption the coating material is applied with a 200 $\mu$m squeegee to an aluminum foil (surface area about 8 ×14 cm). Three test bodies in each case are produced. Thereafter the test bodies are dried for 28 days with a free circulation of air at (23±2)° C. and (50±5)% relative air humidity. The test bodies are then subjected to three cycles under the following conditions:

store for 24 hours in distilled water as (23±2)° C.; and
dry for 24 hours at (50±2)° C.

The test bodies are then conditioned for at least 24 hours but not longer than 3 days under standard conditions {(23±2)° C. and (50±5)% relative air humidity}. (Overall drying and conditioning cycle, see EN ISO 7783-2 and EN 1062 Part 3).

After conclusion of the drying and conditioning procedure the foils with coating are weighed to 0.1 mg ($m_1$). The test bodies are then put into a vessel with distilled water. After immersion for a period of (24±1) hours the test bodies are removed from the water, all water on the surface is removed with a clean dry cloth or filter paper and the test bodies are then weighed to 0.1 mg. They are then immersed again and the surface dried after (24±1 hours and they are weighed again. That procedure is repeated until mass constancy ($m_2$) occurs.

For each test body, the relative change in mass c is calculated in accordance with the following equation as a percentage proportion of the initial mass:

$$c = \frac{m_2 - m_1}{m_1} \cdot 100$$

In the equation:

$m_1$ is the mass of the test body after conditioning and prior to immersion, in milligrams, $m_2$ is the constant mass of the test body after immersion a number of times, in milligrams, and c is the relative change in mass as a percentage proportion of the initial mass, in percent.

(Implementation and calculation are effected on the basis of EN ISO 62 'Determining water absorption' sub-points 6.2 and 7.1).

The compositions according to the invention can be used as molding materials or coating substances depending on their respective composition and consistency. Moldings which have a self-cleaning surface can be produced from molding materials which can be of a doughy or pasty consistency, using known molding processes such as by extrusion from a molding die, by injection molding or the like. The notion of molding materials and moldings is to be interpreted here in the broadest sense and therefore includes for example joint-pointing materials, for example for pointing joints between ceramic tiles, plasters, mortars and the like. Preferably the compositions according to the invention are produced and used as coating substances which can be employed in very different areas of use and can be applied to different substrates such as metal substrates, plastic materials, metals, glass or wood.

An important area of use of coating substances according to the invention are plasters or coating agents or paints for facades and other parts of buildings. Coating substances however can also be used for many other purposes such as for anti-friction surface coatings for boats and ships, as an anti-friction surface coating for skis, as wood protection lacquers and glazes, as coating substances for plastic and aluminum windows, for plastic claddings on facades, as roof coatings, as anti-graffiti protective coatings, as anti-adhesion coatings for containers, tanks and pipes and conduits, as anti-corrosion paint and lacquer, as motor vehicle paint and lacquer, swimming pool coatings, floor coatings, coatings for crash barriers., traffic signs and as road marking paints. These are obviously only some examples of use as the number of possible areas of use is unlimited.

The dispersion, according to the invention, of binding agent, filler and optionally conventional additives is preferably an aqueous dispersion but it can also be a dispersion in organic solvent as in the case of paints and lacquers. Such organic solvents can be aliphatic or aromatic hydrocarbons, for example toluene, esters or ketones, which are known as solvents for binding agents and paint or lacquer. The amount of organic solvent or water added is selected by one skilled in the art depending on the respective intended use. Coating agents which are capable of flow will contain greater amounts of liquid than dough-like molding materials for the production of moldings or joint-pointing materials.

Desirably the binding agent, in each case in relation to the overall weight of the solid component of the molding or coating material, includes between 0.2 and 20% by weight of the hydrophobic resin, resin precursor and/or wax and between 0.5 and 40% by weight of at least one additional curing binding agent.

Preferably the hydrophobic resins or waxes used are additionally oleophobic. The hydrophobic resins or waxes, preferably resins, are desirably silicone resins which in the case of aqueous dispersions must be emulsified or emulsifiable in water. Instead of silicone resins however other resins can also be considered such as fluoropolymers. The resin precursors can be for example silanes and siloxanes which polymerise to form silicone resins. It is important that those resins are hydrophobic. Waxes are inherently hydrophobic and can therefore generally be used as a component of the hydrophobic binding agent.

The additional curing binding agents can be of organic or inorganic nature. Examples of organic curing binding agents are alkyd resins, polyvinyl chloride, chlorine rubber, polyurethanes and epoxy resins. Examples of inorganic curing binding agents are hydraulic binding agents such as cement or lime. Preferably organic polymers are used as additional curing binding agents.

The organic or inorganic fillers with at least bimodal particle size distribution, which can optionally by hydrophobised, are desirably so selected that the particles of the first particle size range (A) are of a mean particle diameter in the range of between 5 and 100 $\mu$m, preferably in the range of between 8 and 40 $\mu$m, in particular in the range of between 10 and 40 $\mu$n in particular between 10 and 20 $\mu$m. The particles of the latter particle size range (B) are preferably of a mean particle diameter of at most 0.1 $\mu$m, preferably in the range of between 0.1 and 0.8 $\mu$m. In addition the coating substances may also contain fillers of other particle size ranges and may thus have a more than bimodal, that is to say a multi-modal particle size distribution. Particularly in the case of plasters, there may be additional proportions of coarser grains. The mean particle diameter is calculated from the sum of the respective largest particle diameters, divided by the number of particles.

The weight ratio of the particles of particle size range (A) to the particles of the latter size range (B) is preferably in the range of between 0.3:1 and 10:1, in particular in the range of between 1.0:1 and 2.5:1. The fillers with at least bimodal particle size distribution may be a unitary filler of different particle sizes or filler mixtures, in particular those in which the particle size range (A) is formed by one filler and the particle size range (B) is formed by another filler. It will be appreciated that in that respect the particle size ranges (A) and (B) may also each be formed by a plurality of different kinds of filler. The fillers may be of organic or inorganic nature, preferably being of inorganic nature. The filler with the particle size range (A) may be for example silicon dioxide, calcium carbonate or Teflon®. The filler with the particle size range (B) may also be silicon dioxide or also for example titanium oxide. It is desirable to use cristobalite for the particle size range (A) and titanium oxide, a colored pigment or a filler for the particle size range (B). It is however also possible to use other fillers. Cristobalite is desirably used in the form of quartz powder.

The binding agent desirably contains, in each case in relation to the solid proportion of the coating substance, preferably between 1.5 and 30, particularly between 2 and 15% by weight, quite particularly up to 6% by weight of additional curing binding agent, and between 1 and 15 and in particular between 1.5 and 4% by weight of hydrophobic resin, resin precursor or wax, in particular silicone resin, silanes, siloxanes or polysiloxanes.

As already mentioned, the selection is preferably for binding agents which contain the smallest possible proportion of water-soluble and/or hydrophilic substances such as emulsifiers and stabilisers. Curing binding agents which are desirably used are mixed polymers of acrylic and methacrylic acid esters with styrene or ethylene-vinyl laurate-vinyl chloride. Other curing binding agents which can be used are pure acrylates, styrene acrylates and other preferably saponification-resistant polymers or mixed polymers. The silicone resins which can be used are for example those with alkyl or alkoxy groups, in which case they are preferably emulsifiable or emulsified in water.

The conventional additives which are optionally added can optionally be hydrophobised and are for example thickeners such as polyurethane thickeners, wetting agents and/or anti-foaming agents, which are desirably respectively added in small amounts, in particular in amounts of less than 2% by weight of the solid proportion of the coating agent.

The invention is further illustrated by means of the following examples. The following percentages by weight of the listed components were intimately mixed with each other, whereupon the static initial contact angle after three minutes was determined in the above-described manner.

EXAMPLE 1

Coating Substance (A)

| | % weight |
|---|---|
| Water | 26.84% |
| Sodium polyacrylate as a wetting agent | 0.15% |
| Polyurethane as a thickening agent | 0.14% |
| Polysaccharide as a thickening agent | 0.20% |
| Magnesium aluminum hydrosilicate as a thickening agent | 0.30% |
| 2-Amino-2-methyl-1-propanol as a wetting agent | 0.50% |
| Combination of liquid hydrocarbons, hydrophobic silicic acid, synthetic copolymers and non-ionogenic emulsifiers as an anti-foaming agent | 0.20% |
| Copolymer based on acrylic and methacrylic acid esters as well as styrene as a binding agent | 12.00% |
| Cristobalite ($d_{50}$ = 13 μm) as a filler | 34.67% |
| Titanium dioxide (d < 1 μm) as a filler | 20.00% |
| Polydimethylsiloxane with amino alkyl groups as a binding agent | 1.00% |
| Alkylalkoxy silane and siloxane as a binding agent | 4.00% |
| Static initial contact angle after three minutes | 140° |
| Maximum water absorption of the coating film | 1.1% |

EXAMPLE 2

Coating Substance (B)

| | % weight |
|---|---|
| Water | 34.84% |
| Sodium polyacrylate as a wetting agent | 0.15% |
| Polyurethane as a thickening agent | 0.14% |
| Polysaccharide as a thickening agent | 0.20% |
| Magnesium aluminum hydrosilicate as a thickening agent | 0.30% |
| 2-Amino-2-methyl-1-propanol as a wetting agent | 0.50% |
| Combination of liquid hydrocarbons, hydrophobic silicic acid, synthetic copolymers and non-ionogenic emulsifiers as an anti-foaming agent | 0.20% |
| Ethylene-vinyl laurate-vinyl chloride terpolymer as a binding agent | 4.00% |
| Cristobalite ($d_{50}$ = 13 μm) as a tiller | 34.67% |
| Titanium dioxide (d < 1 μm) as a filler | 20.00% |
| Polydimethylsiloxane with amino alkyl groups as a binding agent | 1.00% |
| Alkylalkoxy silane and siloxane as a binding agent | 4.00% |
| Static initial contact angle after three minutes | 137° |
| Maximum water absorption of the coating film | 3.4% |

EXAMPLE 3

Concrete Coating Substance

| | % weight |
|---|---|
| Water | 31.10% |
| Sodium polyacrylate as a wetting agent | 0.04% |
| Polyurethane as a thickening agent | 0.16% |
| 2-Amino-2-methyl-1-propanol as a wetting agent | 0.50% |
| Combination of liquid hydrocarbons, hydrophobic silicic acid, synthetic copolymers and non-ionogenic emulsifiers as an anti-foaming agent | 0.20% |
| Cellulose fibers as a thickening agent | 1.00% |
| Copolymer based on acrylic and methacrylic acid esters as a binding agent | 12.00% |
| Cristobalite ($d_{50}$ = 13 μm) as a filler | 30.00% |
| Titanium dioxide (d < 1 μm) as a filler | 20.00% |
| Silane polydimethylsiloxane with amino alkyl groups as a binding agent | 5.00% |
| Static initial contact angle after three minutes | 135° |

EXAMPLE 4

Plaster

| | % weight |
|---|---|
| Water | 15.27% |
| Sodium polyacrylate as a wetting agent | 0.03% |
| 2-Amino-2-methyl-1-propanol as a wetting agent | 0.60% |
| Combination of liquid hydrocarbons, hydrophobic silicic acid, synthetic copolymers and non-ionogenic emulsifiers as an anti-foaming agent | 0.20% |
| Methyl hydroxyethyl cellulose as a thickening agent | 0.05% |
| Copolymer based on acrylic and methacrylic acid esters as a binding agent | 4.80% |
| Silicon dioxide ($d_{50}$ = 13 μm) as a filler | 19.00% |
| Silicon dioxide ($d_{50}$ = 280 μm) as a filler | 8.50% |
| Titanium dioxide (d < 1 μm) as a filler | 5.00% |
| Silane polydimethylsiloxane with amino alkyl groups as a binding agent | 4.50% |
| Aluminum hydroxide as a fire protection agent | 5.00% |
| Magnesium stratified silicate as a thickening agent | 0.10% |
| Aliphatic/aromatic hydrocarbon mixture in the range of between C9 and C12 as a film-forming aid | 1.30% |
| Tripropylene glycolmonomethylether as a film-forming aid | 0.30% |
| Fluorocarbon polymer as a binding agent | 0.30% |
| Calcium carbonate as graining | 35.00% |
| Static initial contact angle after three minutes | 135° |

What is claimed is:

1. A material comprising a dispersion of between 0.2 and 20% of a first hydrophobic binding agent by weight of solids selected from the group consisting of resin, resin precursor, wax and mixtures thereof; between 0.5 and 40% by weight of solids of at least one additional curing binding agent; and a filler wherein the filler has an at least bimodal particle size distribution, wherein one particle size range (A) has a mean particle diameter of at least 5 μm and the other particle size range (B) has a mean particle diameter of at most 3 μm and the weight ratio of the particle size range (A) to the particles of the particle size range (B) is between 0.01:1 and 12:1; said dispersion containing insufficient hydrophilic components so that the static initial water contact angle of a coating formed from the dispersion after 3 minutes equilibrium is greater than 130°.

2. A material as set forth in claim 1 wherein it has a maximum water absorption of less than 10% by weight.

3. A material as set forth in claim 1 wherein it has a maximum water absorption of less than 5% by weight.

4. A material as set forth in claim 1 wherein it has a maximum water absorption of less than 2% by weight.

5. A material as set forth in claim 1 wherein the particles of particle size range (A) have a mean diameter in the range of between about 5 and about 100 μm.

6. A material as set forth in claim 1 wherein the particles of particle size range (A) have a mean diameter in the range of between about 8 and about 60 μm.

7. A material as set forth in claim 1 wherein the particles of particle size range (A) have a mean diameter in the range of between about 10 and about 40 μm.

8. A material as set forth in claim 5 wherein the particles of particle size range (B) have a mean particle diameter of at most 1 μm.

9. A material as set forth in claim 6 wherein the particles of particle size range (B) have a mean particle diameter of at most 1 μm.

10. A material as set forth in claim 5 wherein the particles of particle size range (B) have a mean particle diameter of from between 0.1 and 0.8 μm.

11. A material as set forth in claim 1 wherein the weight ratio of the particles of particle size range (A) to the particles of particle size range (B) is between 0.3:1 and 10:1.

12. A material as set forth in claim 3 wherein the weight ratio of the particles of particle size range (A) to the particles of particle size range (B) is between 0.3:1 and 10:1.

13. A material as set forth in claim 7 wherein the weight ratio of the particles of particle size range (A) to the particles of particle size range (B) is between 0.3:1 and 10:1.

14. A material as set forth in claim 1 wherein the weight ratio of the particles of particle size range (A) to the particles of particle size range (B) is between 0.3:1 and 10:1; preferably in the range of between 1.0:1 and 2.5:1.

15. A material as set forth in claim 1 wherein the binding agent contains between about 1.5 and about 30 percent of additional curing binding agent by weight of solids.

16. A material as set forth in claim 1 wherein the binding agent contains between about 1 and about 15 percent of silicone resin by weight of solids in the coating substance.

17. A material as set forth in claim 3 wherein the binding agent contains between about 1 and about 15 percent of silicone resin by weight of solids in the coating substance.

18. A material as set forth in claim 6 wherein the binding agent contains between about 1 and about 15 percent of silicone resin by weight of solids in the coating substance.

19. A material as set forth in claim 1 wherein the filler contained therein contains at least two different inorganic substances of which one forms the particles of the particle size range (A) and the other forms the particles of the particle size range (B).

20. A molding or coating material as set forth in claim 19 wherein the particles of the particle size range (A) comprise cristobalite and the particles of the particle size range (B) comprise titanium dioxide.

21. A material as set forth in claim 1 wherein it contains an additive selected from the group consisting of thickeners, wetting agents, organic fiber material, inorganic fiber materials, anti-foaming agent and mixtures thereof.

22. A method for coating a surface comprising applying the material of claim 1 to the surface.

23. A method for coating a surface comprising applying the material of claim 2 to the surface.

24. A method for coating a surface comprising applying the material of claim 3 to the surface.

25. A method for coating a surface comprising applying the material of claim 6 to the surface.

26. A method for coating a surface comprising applying the material of claim 15 to the surface.

27. A method for coating a surface comprising applying the material of claim 19 to the surface.

28. A method for coating a surface comprising applying the material of claim 20 to the surface.

29. The material of claim 1 where the curing binding agent is selected from the group consisting of alkyd resins, polyvinyl chloride, chlorine rubber, polyurethanes, and epoxy resins.

* * * * *